US007552086B1

(12) United States Patent
Rajasekar et al.

(10) Patent No.: US 7,552,086 B1
(45) Date of Patent: Jun. 23, 2009

(54) METHODS AND SYSTEMS FOR MANAGING CREDIT

(75) Inventors: Sunil Rajasekar, Mountain View, CA (US); Tapomoy Dey, Sunnyvale, CA (US); Kathy Weitzel, Cornelius, NC (US); Ajay Pandit, Fremont, CA (US); Alan Fothergill, San Francisco, CA (US)

(73) Assignee: Oracle International Corp., Redwood Shores, CA (US)

( * ) Notice: Subject to any disclaimer, the term of this patent is extended or adjusted under 35 U.S.C. 154(b) by 1367 days.

(21) Appl. No.: 10/005,102

(22) Filed: Dec. 3, 2001

(51) Int. Cl.
*G06Q 40/00* (2006.01)
(52) U.S. Cl. .................................................. 705/38
(58) Field of Classification Search ............. 705/35–40
See application file for complete search history.

(56) References Cited

U.S. PATENT DOCUMENTS

| | | | |
|---|---|---|---|
| 4,736,294 A | 4/1988 | Gill et al. | |
| 5,611,052 A | 3/1997 | Dykstra et al. | |
| 5,765,144 A * | 6/1998 | Larche et al. | 705/38 |
| 5,930,776 A | 7/1999 | Dykstra et al. | |
| 6,029,149 A | 2/2000 | Dykstra et al. | |
| 6,088,686 A * | 7/2000 | Walker et al. | 705/38 |
| 6,208,979 B1 | 3/2001 | Sinclair | |
| 6,385,594 B1 | 5/2002 | Lebda et al. | |
| 6,643,625 B1 * | 11/2003 | Acosta et al. | 705/38 |
| 6,807,533 B1 * | 10/2004 | Land et al. | 705/30 |
| 6,823,319 B1 | 11/2004 | Lynch et al. | |
| 2001/0051960 A1 | 12/2001 | Kubick et al. | |
| 2002/0040312 A1 * | 4/2002 | Dhar et al. | 705/8 |
| 2002/0103749 A1 * | 8/2002 | Agudo et al. | 705/38 |

OTHER PUBLICATIONS

Epper, K., "UJB Signs with BancA For Loan Automation", American Banker, New York, N.Y.: Sep. 7, 1994, vol. 159, Iss. 169; p. 14.*

(Continued)

*Primary Examiner*—Hani Kazimi
*Assistant Examiner*—Olabode Akintola
(74) *Attorney, Agent, or Firm*—Young Law Firm, P.C.

(57) ABSTRACT

Disclosed herein are methods and systems for a credit grantor to manage a credit of a credit requestor. The method may include steps of, upon the occurrence of an event: assigning a Credit Classification to the credit requestor, the Credit Classification being related to the credit risk of the credit requestor and determining the Type of Review to carry out for the credit requestor based upon a nature of the event. A checklists of data items required to be collected may then be selected or assembled, the data items of the checklist being determined at least by a combination of the assigned Credit Classification and the determined Type of Review. A case folder for the requestor may then be created or updated, the case folder including the selected checklist of data items to be collected. A value for each required data item of the selected checklist may then be collected and stored in the case folder. The collected data items in the case folder may then be analyzed according to a score sheet and a workflow, the score sheet being determined at least by the combination of the assigned Credit Classification and determined Type of Review. A credit score for the credit requestor may the be calculated, and a recommended action generated (and optionally implemented) based upon the calculated credit score.

81 Claims, 6 Drawing Sheets

OTHER PUBLICATIONS

Woodrough, S., "Managing the Lending Function", Independent Banker. Sauk Centre, Feb. 1995, vol. 45, Iss. 2; p. 16.*

Van Dellen, S., "Manufacturing a new loan program", Mortgage Banking. Washington: May 1999, vol. 59, Iss. 8; p. 60.*

* cited by examiner

| File | Edit | View | Go | Help | | | | |
|---|---|---|---|---|---|---|---|---|
| | | | | | | 200 | | |

Checklist

| DATA ITEM | REQUIRED | OPTIONAL | | |
|---|---|---|---|---|
| | | | 402 — Name | Low Risk Annual Review ▶ |
| | | | 102 — Credit Classification | Mature/Stable Customer ▶ |
| | | | 104 — Type of Review | Annual Credit Evaluation ▶ |
| Party Credit Limit | ✓ | | | |
| High Credit Amount | ✓ | | | |
| Last Credit Review Date | ✓ | | | |
| Last Credit Recommendation | ✓ | | | |
| Last Internal Credit Score | ✓ | | | |
| Days Sales Outstanding | ✓ | | | |
| Average Payment Days | ✓ | | | |
| Current Amount Due | ✓ | | | |
| 30 Days past Due Amount | ✓ | | | |
| 60 Days past Due Amount | ✓ | | | |
| 90 Days past Due Amount | ✓ | | | |
| Over 90 Days past Due Amount | ✓ | | | |
| Current Invoice Value | | ✓ | | |
| Bank Name | | | 404 | |
| Current Balance | ✓ | | | |
| Average Balance | ✓ | | | |
| Last Update Date | | | | |
| EDGAR Report | | | | |

Return

*FIG. 4*

METHODS AND SYSTEMS FOR MANAGING CREDIT

BACKGROUND OF THE INVENTION

1. Field of the Invention

This invention relates to the field of credit management.

2. Description of the Related Art

Effective credit management may be defined as the ability to balance the customers purchasing power with the financial solvency of the party granting the credit. Effective credit management improves profitability by minimizing bad debt, reduces Days Sales Outstanding (DSO) and reduces collection activities and the costs associated with collection activities. In addition, the ability to effectively manage credit is important for short-term cash flow as well as for long-term financial stability.

Currently, credit managers manage their accounts either manually with paper files, spreadsheets or various software packages. Paper files are cumbersome, difficult to maintain and ill suited to the increasingly automated credit management field. Existing Enterprise Resource Planning (ERP) software packages typically do not adequately support many credit management functions. For that reason, many users of existing ERP software packages also use secondary software for credit management to perform specific functions, such as financial analysis or credit scoring, for example. Moreover, such existing software packages are not believed to enable credit analysts to adequately distinguish gradations within the wide spectrum of credit customers and different types of credit review and to use that information to guide the credit decisioning process.

SUMMARY OF THE INVENTION

It is an object of the present invention, therefore, to provide methods and systems that enable the credit decisioning process to be guided by a precise definition of the credit status of the customer and by a fine grained approach to the type of credit review to be carried out. It is another object of the present invention to provide methods and systems that enable credit managers to efficiently and consistently manage and automate at least a portion of the credit decisioning process.

According to an embodiment thereof, the present invention is a computer-implemented method for a credit grantor to manage a credit of a credit requestor, comprising the steps of, upon the occurrence of an event: assigning a Credit Classification to the credit requestor, the Credit Classification being related to the credit risk of the credit requestor; determining a Type of Review to carry out for the credit requestor based upon a nature of the event; selecting one of a plurality of checklists of data items required to be collected, the data items of the selected checklist being determined at least by a combination of the assigned Credit Classification and the determined Type of Review; creating or updating a case folder for the requestor, the case folder including the selected checklist of data items to be collected; collecting each required data item of the selected checklist and storing each collected data item in the case folder; analyzing the collected data items in the case folder according to a score sheet and a workflow, the score sheet being determined at least by the combination of the assigned Credit Classification and the determined Type of Review and calculating a credit score for the credit requestor, and generating a recommended action based upon the calculated credit score.

The event may be initiated by the credit requestor or by the credit grantor, for example. The event may include a timed action by the credit grantor and/or an action by the credit requestor. The timed action by the credit grantor may include a periodic credit review of the credit requestor's credit. The action by the credit requestor may include a request by the credit requestor for an increased credit limit, a request for new credit by a prospect, an order by the credit requestor, a hold on an order and/or at least one definable action, for example. The Credit Classification of the credit requestor may be selected from a group including mature, newly established, emerging, externally funded, prospect and/or a definable Credit Classification, for example. The Type of Review may be selected from a group including new credit limit, quarterly review, semi-annual review, annual review, order, order hold, over-credit limit and/or a definable Type Of Review, for example. The data collecting step may include accessing an internal database of credit information and/or an external database of credit information over a computer network (including the Internet, for example). The internal database of credit information may include accounts receivables information for the credit requestor. The collecting step may include a step of manually collecting at least some of the required data items of the selected checklist. A step of selecting one of a plurality of credit score sheets based upon the assigned Credit Classification and the determined Type of Review may be carried out. The score sheets, according to the present invention, may establish required ranges for at least some of the collected data items of the selected checklist. The method may also include a step of calculating the score from the selected score sheet which is selected by the assigned Credit Classification and the determined Type Of Review, the calculated score sheet establishing required ranges for at least some of the collected data items of the selected checklist. The required ranges may vary for each data item depending at least upon the assigned Credit Classification and the determined Type of Review. The analyzing step may be carried free of intervention from a human credit analyst when each of the collected data items fall within the corresponding required ranges established by the selected one of the plurality of score sheets. The analyzing step may be carried out at least partially by a human credit analyst. The checklists of data items to be collected may include one or more optional data items. The method may further include a step of storing a time-stamped version of the case folder. The method may also include a step of implementing the recommended action according to an automation rule selected from among a plurality of predefined automation rules, within the workflow. The implementing step may include a notifying step in which the credit requestor is notified of the recommended action and/or the implementation of the recommended action. The implementing step may include a notifying step in which a human analyst is notified of the recommended action and/or the implementation of the recommended action. The notifying step may include an emailing step, a faxing step, a letter generating step and/or a step of updating a Web site, for example. The case folder may include a free form notes field configured to enable a credit analyst to enter free form notes therein. According to an embodiment of the present invention, the generating step may be not carried out until all required data items are collected and stored in the case folder. The method may further comprise a step of notifying a human credit analyst if all required data items cannot be collected. The workflow may include a step that specifies that the case folder is to be forwarded to a human credit analyst or through a hierarchy of credit analysts for review and approval prior to implementing the recommended action. The workflow may include a rule that specifies that the generated recommended action may be implemented without forwarding the case folder to a human credit analyst or through a hierarchy of credit analysts for review and approval prior to implementing the recommended action.

The present invention may also be viewed as a computer-implemented method for a credit grantor to select one of a plurality of credit policies to apply to a credit request of a credit requestor, comprising the steps of: assigning credit requestor a Credit Classification, the assigned Credit classification being a measure of the credit risk of the credit requestor; determining a Type of Review to carry out for the credit requestor based upon an event that triggered the credit grantor to select a credit policy and selecting one of the plurality of credit policies based upon a combination of the assigned Credit Classification and the determined Type of Review.

The credit policy may include a checklist of data items to be collected. The checklist may be selected based upon the combination of the assigned Credit Classification and the determined Type of Review. The credit policy may also include a score sheet, the score sheet defining a range for values for each data item in the checklist. The credit policy may include a workflow, the workflow determining a manner in which the credit request is processed. The workflow may include one or more steps that define how the credit request is processed from one software process to another software process and/or from one credit analyst to another credit analyst.

The present invention may also be viewed as a system for a credit grantor to manage the credit of a credit requestor, comprising: at least one processor; at least one data storage device; a plurality of processes spawned by the at least one processor, the processes including processing logic for, upon the occurrence of an event: assigning a Credit Classification to the credit requestor, the Credit Classification being related to the credit risk of the credit requestor; determining a Type of Review to carry out for the credit requestor based upon the nature of the event; selecting one of a plurality of checklists of data items required to be collected, the data items of the selected checklist being determined at least by a combination of the assigned Credit Classification and the determined Type of Review; creating or updating a case folder for the requestor, the case folder including the selected checklist of data items to be collected; collecting each required data item of the selected checklist and storing each collected data item in the case folder; analyzing the collected data items in the case folder according to a score sheet, the score sheet being determined at least by the combination of the assigned Credit Classification and the determined Type of Review and calculating a credit score for the credit requestor, and generating a recommended action based upon the calculated credit score, and a workflow determining the manner in which the processes are executed.

The present invention may also be viewed as a machine-readable medium having data stored thereon representing sequences of instructions which, when executed by a computing device, causes the computing device to enable a credit grantor to manage a credit of a credit requestor, the sequences of instructions being configured to carry out the steps of, upon the occurrence of an event: assigning a Credit Classification to the credit requestor, the Credit Classification being related to the credit risk of the credit requestor; determining a Type of Review to carry out for the credit requestor based upon a nature of the event; selecting one of a plurality of checklists of data items required to be collected, the data items of the selected checklist being determined at least by a combination of the assigned Credit Classification and the determined Type of Review; creating or updating a case folder for the requestor, the case folder including the selected checklist of data items to be collected; collecting each required data item of the selected checklist and storing each collected data item in the case folder; analyzing the collected data items in the case folder according to a score sheet, the score sheet being determined at least by the combination of the assigned Credit Classification and determined Type of Review and calculating a credit score for the credit requestor; and generating a recommended action based upon the calculated credit score, and a workflow determining the manner in which the steps are executed.

BRIEF DESCRIPTION OF THE DRAWINGS

For a further understanding of the objects and advantages of the present invention, reference should be made to the following detailed description, taken in conjunction with the accompanying figures, in which:

FIG. 4 shows an exemplary Web browser screen showing an exemplary checklist, according to an embodiment of the present invention.

DESCRIPTION OF THE PREFERRED EMBODIMENTS

Functional Overview

Figures 1, 2:
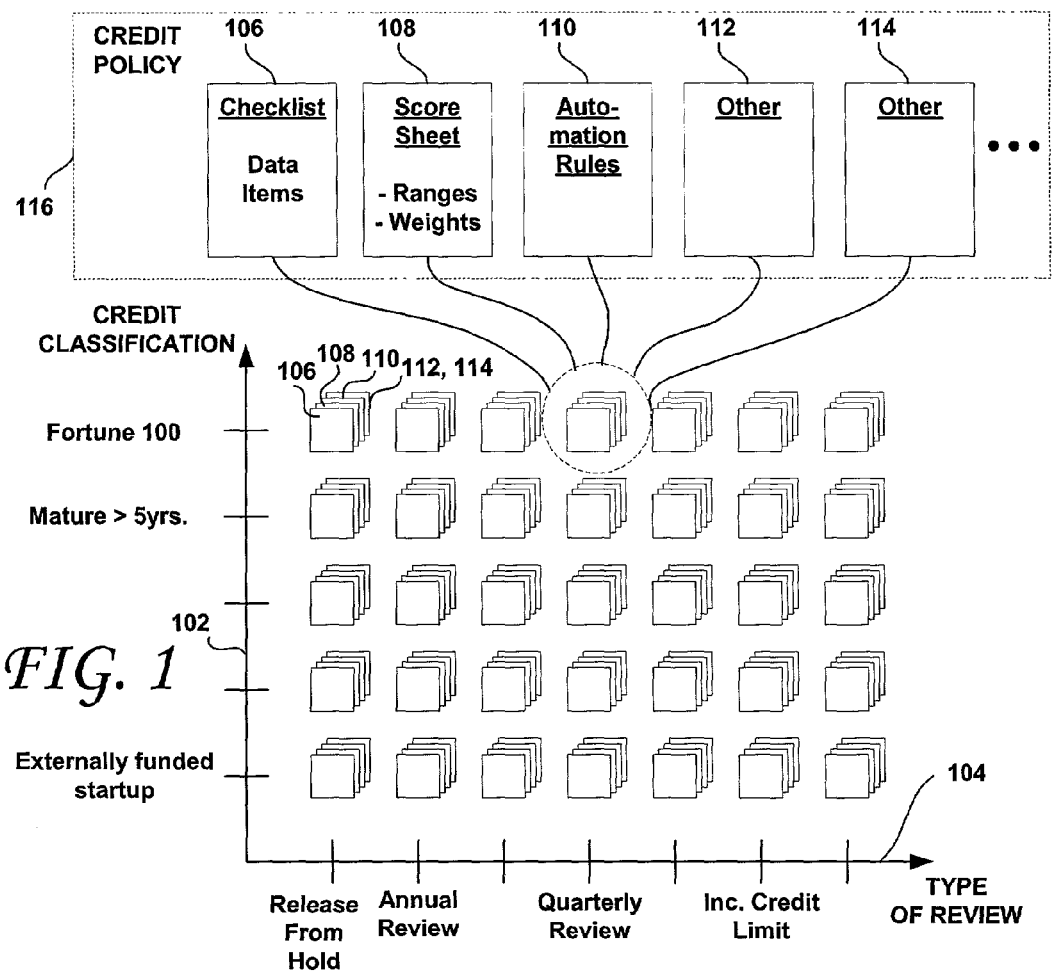
FIG. 1 is a graph of Credit Classifications versus Types Of Review that graphically illustrates the manner in which credit policies are selected, according to an embodiment of the present invention.
FIG. 2 is an exemplary chart that associates various checklists and credit score sheets with different combinations of Credit Classifications and Types Of Review, according to an embodiment of the present invention.

The present invention enables credit managers to consistently apply a variety of definable credit policies to clients as well as to prospective clients. The present invention provides a selectable degree of automation to the credit management process, from complete automation of the credit decisioning process to a process carried out at least in part by human credit analysts based upon credit data items collected automatically, partially automatically or fully manually. According to the present invention and as shown in FIG. 1, the credit policy 116 applied by a credit grantor (such as a vendor or any entity having the authority to review and approve credit, for example) to any credit of a credit requestor (such as an existing client or prospect or any entity that requests credit or to whom credit is extended) is selected according to the credit requestor's assigned Credit Classification and the Type of Review, as determined by the credit grantor. Indeed, according to the present invention, the credit policy 116 indicates the type of analysis to be performed based upon the Credit Classification of the credit requestor being reviewed and the Type of Review to be carried out. According to the present invention, the Credit Classification is a measure of the credit risk of the credit requestor. For example, companies requesting credit or for which a credit review is indicated, may be classified as mature, newly established, emerging or, as shown in the ordinate 102 of FIG. 1, externally funded startup, mature over 5 years, or Fortune 100 (shown in FIG. 1 in the order of decreasing credit risk, although that need not be the case). The credit grantor may add to or substitute its own Credit Classifications for the classifications listed herein. The Type Of Review shown on the abscissa 104 of FIG. 1 indicates the reason for the credit review. Indeed, a credit review may have been triggered by an external event (for example, a customer going over their pre-established credit limit may be treated as a request to increase their credit limit), or may have been triggered by the passage of time (such as a quarterly or annual credit review, for example) or may be initiated by the credit grantor, for example. Examples of Types Of Review include New Credit Limit, Quarterly Review, Semi-Annual Review, Annual Review, Release from Hold, Order Hold, for example. Other Types Of Review appropriate to the credit grantor's business may readily be added to or substituted for any of the exemplary Types Of Review listed herein.

Each credit policy 116 may be unique to the combination of Credit Classification and Type of Review or one or more credit policies 116 may be shared among two or more Credit Classification, Type of Review combinations. In any event, each Credit Classification, Type of Review combination corresponds to a credit policy 116, which may or may not be unique to that Credit Classification, Type of Review combination. In the graphical representation of FIG. 1, the intersection of the Credit Classification and the Type of review drives the selection of the credit policy 116 that, in turn, drives the manner in which a credit request by a credit requestor is processed.

According to the present invention, each credit policy 116 includes at least a checklist 106. When a credit review occurs (for whatever reason and whether initiated by the credit grantor or the credit requestor), one of a plurality of checklists 106 is selected, based at least in part upon the assigned Credit Classification and the determined Type Of Review. The checklist 106 includes a plurality of data items that must be collected for the review to proceed and successfully conclude. The checklist 106 may also include one or more optional data items that may (but need not) be collected for the credit review to successfully proceed. An exemplary checklist 106 is shown in FIG. 4. FIG. 4 shows the checklist 106, as displayed on a Web browser 200. As shown therein, the checklist 106 may be identified with a name 402, such as the exemplary "Low Risk Annual Review". In the example of FIG. 4, the checklist 106 is associated with the exemplary Credit Classification 102 "Mature/Stable Customer" and with the exemplary Type Of Review 104 "Annual Credit Evaluation". The checklist 106 establishes the data items 404 to be collected and indicates whether such items must be collected (required data items) and those that may but need not be collected (optional data items). It is to be understood that the data items 404 shown in FIG. 4 are but examples of such data items and that most any data items 404 may be defined and included in the checklist 106. A lesser or greater number of such data items 404 may be included in the checklist 106, as befits the credit grantor and/or the particular industry in which the present credit management methods and systems are deployed. Moreover, checklists 106 associated with different Credit Classifications and/or Types of Review may include different data items 404, as appropriate for the Credit Classification assigned to the credit requestor and the Type of Review determined by the credit grantor. For example, the checklist 106 selected for a combination of a credit requestor classified as mature and stable and for a review such as an annual credit evaluation may require the collection of only a few data items 404, whereas a greater number of data items may be required to be collected for a less mature customer seeking to increase their credit limit.

Figure 3:
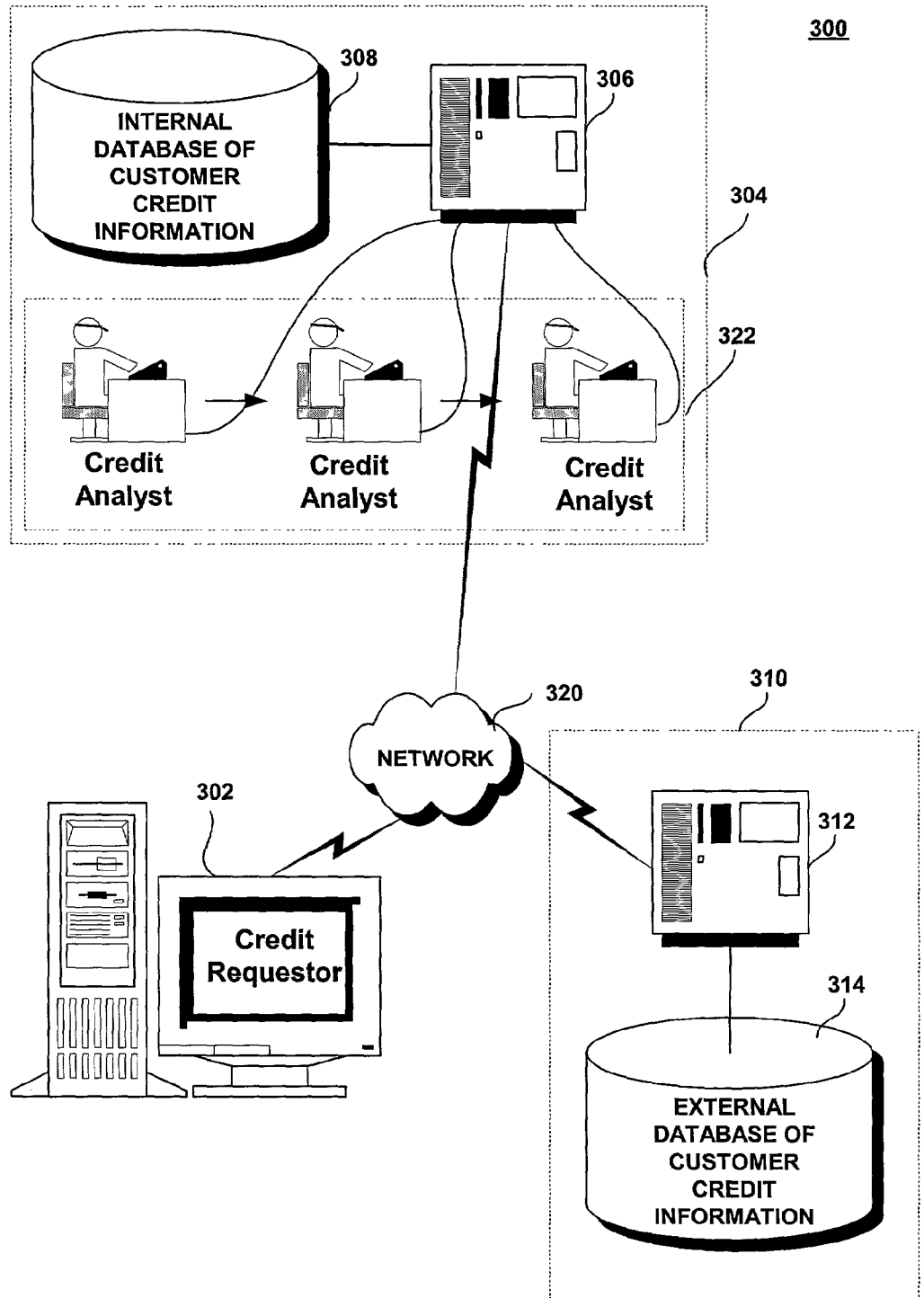
FIG. 3 shows a system for managing credit, according to an embodiment of the present invention.

FIG. 3 shows a system for managing credit, according to an embodiment of the present invention. Numeral 304 in FIG. 3 references the credit grantor and reference numeral 310 denotes the credit requestor. The values for the data items 404 of the selected checklist 106 may be collected from the credit requestor 302, from internal credit information in possession of the credit grantor (such as Accounts Receivable (AR) information, for example) stored in databases internal to or accessible by the credit grantor 304 and/or from one or more external sources 310 of credit data, for example. For example, one such external source 310 of credit data is Dun & Bradstreet®. Such external sources 310 of credit information may be accessed, for example, through a computer network 320 such as the Internet, for example. The credit grantor 304 may also include one or more human credit analysts and/or a hierarchy 322 of such credit analysts, as developed further below.

Once the proper checklist 106 is selected for the assigned Credit Classification and the determined Type of Review, a case folder may be created and/or updated for the credit requestor and the selected checklist 106 may be stored in the created case folder. A case folder, according to an embodiment of the present invention is an electronic collection of data that is configured to contain all of the credit information necessary to render a decision on the credit request or the credit review. According to an embodiment of the present invention, the case folder may be date-stamped and stored in a safe location. A copy of the stored case folder may then be updated with new information and thereafter date-stamped and stored at some later time. In this manner, it becomes possible to maintain a history comprising a series of date-stamped case folders for each customer. A checklist 106 may be selected and stored in a case folder, for example, upon initiating a credit review or upon receiving a credit request by an existing customer or a prospective customer (a prospect). A checklist 106 may also be selected and stored in a case folder upon occurrence of an event, such as by a credit request initiated by the credit grantor. A checklist 106 may also be assigned to a case folder upon the occurrence of an event that was not initiated by either party, such as a credit request based upon the passage of a predetermined time interval. This time interval may be defined by the end of a quarter or fiscal year, for example, when the quarterly and annual credit reviews may be automatically initiated. In this case, the Credit Classification of the credit requestor that is the subject of the review is retrieved and the checklist 106 appropriate to the retrieved Credit Classification and the Type of Review is selected and stored in a new or existing case folder.

The case folder may be updated as values for the data items 404 are collected. The case folder may also include a free form field that is configured to enable a credit analyst (such as shown in the hierarchy 322) to enter free form notes therein. The case folder may also be configured to include or be associated with one or more attachments. Such attachments may include a Web page, a faxed image or a scanned report that may be collected during the credit analysis process, for example.

FIG. 2 is an exemplary table that defines credit policies 116 by associating various checklists 106 and credit score sheets 108 with different combinations of Credit Classifications 102 and Type of Review 104, according to an embodiment of the present invention. The table of FIG. 2 is shown displayed in a Web browser 200, as the present invention may readily be implemented over the World Wide Web. The constituent elements of each row of the table of FIG. 2 may collectively represent at least a portion of a credit policy 116 (as other business rules and/or other considerations 112, 114—see FIG. 1—may play a part in the evaluation of a credit request or evaluation). The chart of FIG. 2 shows the correspondence between the Credit Classification 102, the Type of Review 104, the checklist 106 and the score sheet 108. A score sheet 108 may be assigned for each checklist 106 and may be dynamically calculated at the time the Credit Classification is assigned and the Type of Review is determined. The score sheet 108, according to an embodiment of the present invention, may be used to assign ranges to each of the constituent data items 404 of each checklist 106, a score corresponding to each assigned range and a weighting factor for each score, which is a function of the relative importance to the overall credit score of each data item 404. For example, a score sheet 108 may be assigned to an emerging startup (Emerging Startup=Credit Classification) with which the credit grantor has no previous relationship (New Credit=Type of Review). Such Credit Classification/Type Of Review combination may be associated with a checklist 106 called "High Risk New" and a "Conservative" score sheet 108. Such a conservative score sheet 108 may be defined so as to place stringent limits on any company falling within the Emerging Startup Credit Classification and the New Credit Type of Review categorization to minimize the credit grantor's exposure to potentially bad debt. For example, a conservative score 108 sheet may establish narrow ranges for the values collected for each of the data items listed in the High Risk New checklist 106. The present invention may be implemented with drop-down menus to enable the credit grantor 304 to change the score sheet 108 (or any other element of the table) as desired.

Table 1 below shows a portion of an exemplary score sheet 108 that establish ranges and corresponding scores for collected values for each data item within a selected checklist 106. For example, the data item 404 "Days Sales Outstanding" (DSO), the score sheet 108 may define the ranges for the values thereof and the corresponding scores as follows:

TABLE 1

DAYS SALES OUTSTANDING (DSO)

| RANGE | VALUES | SCORE |
|-------|--------|-------|
| 1 | 0-7 | 10 |
| 2 | 8-13 | 6 |
| 3 | 14-30 | 3 |
| 4 | 31-9999 | 0 |

The scores for each of the values of the data items listed in the checklist 106 may then be summed and optionally weighted by one or more weighting factors to arrive at an overall credit score. An overall credit score need not be computed, for example, if the credit policy for a particular Credit Classification, Type Of Review combination does not require such.

Automation rules 110 (see FIG. 1) may be defined for each Credit Classification, Type of Review combination. A workflow, according to the present invention, may be defined as a method determining the manner in which a case folder is passed to and from software processes and/or credit analysts, according to one or more workflow steps. Referring once again to the graphical representation of FIG. 1, the intersection of the Credit Classification and Type of Review may at least partially determine the selection of the automation rule (s) that are used by the workflow to route the case folder from creation to recommended action and/or recommendation implementation. For example, an automation rule 110 may specify that that a credit score of between 0 to 50 requires that the case folder be forwarded to a human credit analyst or routed through a hierarchy 322 of such credit analysts for review or prior to implementation of a recommended action, that a credit score of between 51 and 70 automatically qualifies the credit requestor for a credit limit of $150,000 and that a credit score of between 71 and 100 automatically qualifies the credit requestor for a $200,000 credit limit. Such automation rules enable a great degree of automation and render possible at least limited self-service credit management by the credit requestor 302. In many cases, the automation rules may require more than one person to approve the generated recommendation, depending (for example) upon the associated risk to the credit grantor. The automation rules, according to the present invention, may be defined so as to respect a predetermined approval hierarchy 322 (see FIG. 3), in order to insure that approvals are obtained from those having the proper authority within the credit grantor's organization. Such an approval hierarchy 322 may identify those credit analysts in the credit grantor's organization having the authority to approve credit limits or other actions, depending upon the level of credit extended to the credit requestor 302, for example.

Figure 5:
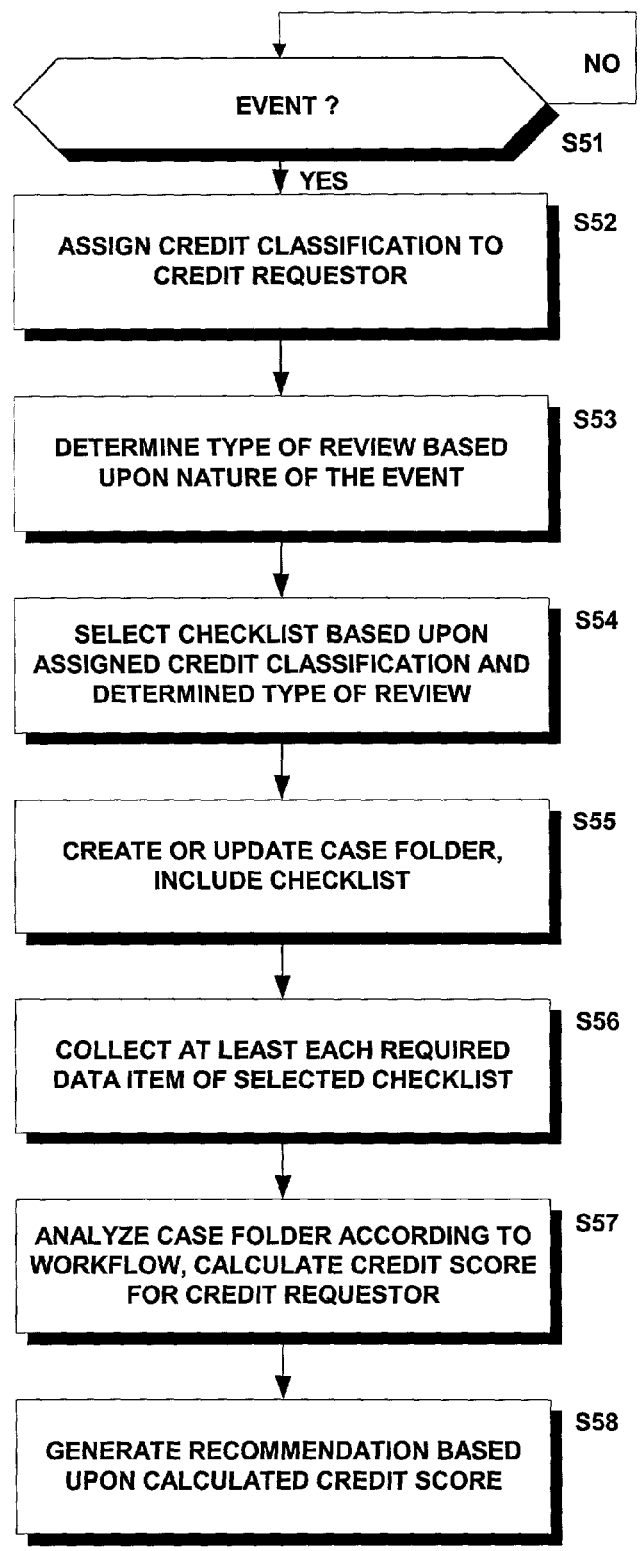
FIG. 5 is a flowchart of certain aspects of the present invention, according to an embodiment thereof.

FIG. 5 is a flowchart of certain aspects of the present invention, according to an embodiment thereof. As shown therein, step S51 calls for the determination of the occurrence of an event, such as the passage of a predetermined period of time (such as the end of a fiscal year or quarter, for example) or a credit request from a credit requestor, for example. Upon the occurrence of such an event that triggers a credit review, a credit classification may be assigned to the credit requestor, as shown at S52. This assigned Credit Classification may be the same Credit Classification as may have been previously assigned to the credit requestor or may be a new Credit Classification based upon changed circumstances of the credit requestor. Thereafter, based upon the nature of the event in step S51, the Type Of Review is determined, as detailed above. Alternatively, step S53 may be carried out before step S52. In step S54, based upon the combination of the assigned Credit Classification and the determined Type Of Review, a credit policy 116 may be selected. According to the present invention and as shown at S54, the selected credit policy 116 includes at least a selected checklist 106 of data items 404 that must and/or may be collected from sources 308 internal to the credit grantor 304 and/or from sources 314 that are external thereto. Alternatively, the checklist 106 may be dynamically assembled upon assigning a Credit Classification to the credit grantor 304 and determining the Type of Review to carry out. A case folder may then be created and/or updated and the selected checklist 106 stored therein, as called for by step S55. Alternatively, the case folder may be created and/or update prior to the selection or calculation of the checklist 106. In step S56, values for at least the required data items 404 may be collected from the sources 308 internal to the credit grantor 304 and/or from sources 314 that are external thereto. That is, as shown in FIG. 3, the server 306 of the credit grantor 304 may configured to collect values for the required (and optional) data items 404 listed in the selected checklist 106 from the internal database of customer credit information 308 and/or request values for the data items 404 from the server 312 of an external source of credit information, such as Dun & Bradstreet, for example. The server 312, responsive to the request from the server 306 of the credit grantor 304, may retrieve the requested values from the external database 314 coupled thereto and return the requested values of the data items 404 to the server 306 of the credit grantor 304. As outlined in step S57, the collected data items 404 in the case folder may then be analyzed according to automation rules 110 determined at least by the combination of the assigned Credit Classification 102 and determined Type Of Review 104. A credit score may then be calculated for the credit requestor 310, as called for by step S57. A recommendation may then be generated, as shown at S58. The recommendation may be entirely or partially based upon the calculated credit score and may include a recommended action. The recommended action, for example, may call for a credit limit to be increased, lowered, an order to be placed on hold pending resolution of a credit problem or an order released from hold, to name a few possibilities.

Figure 6:
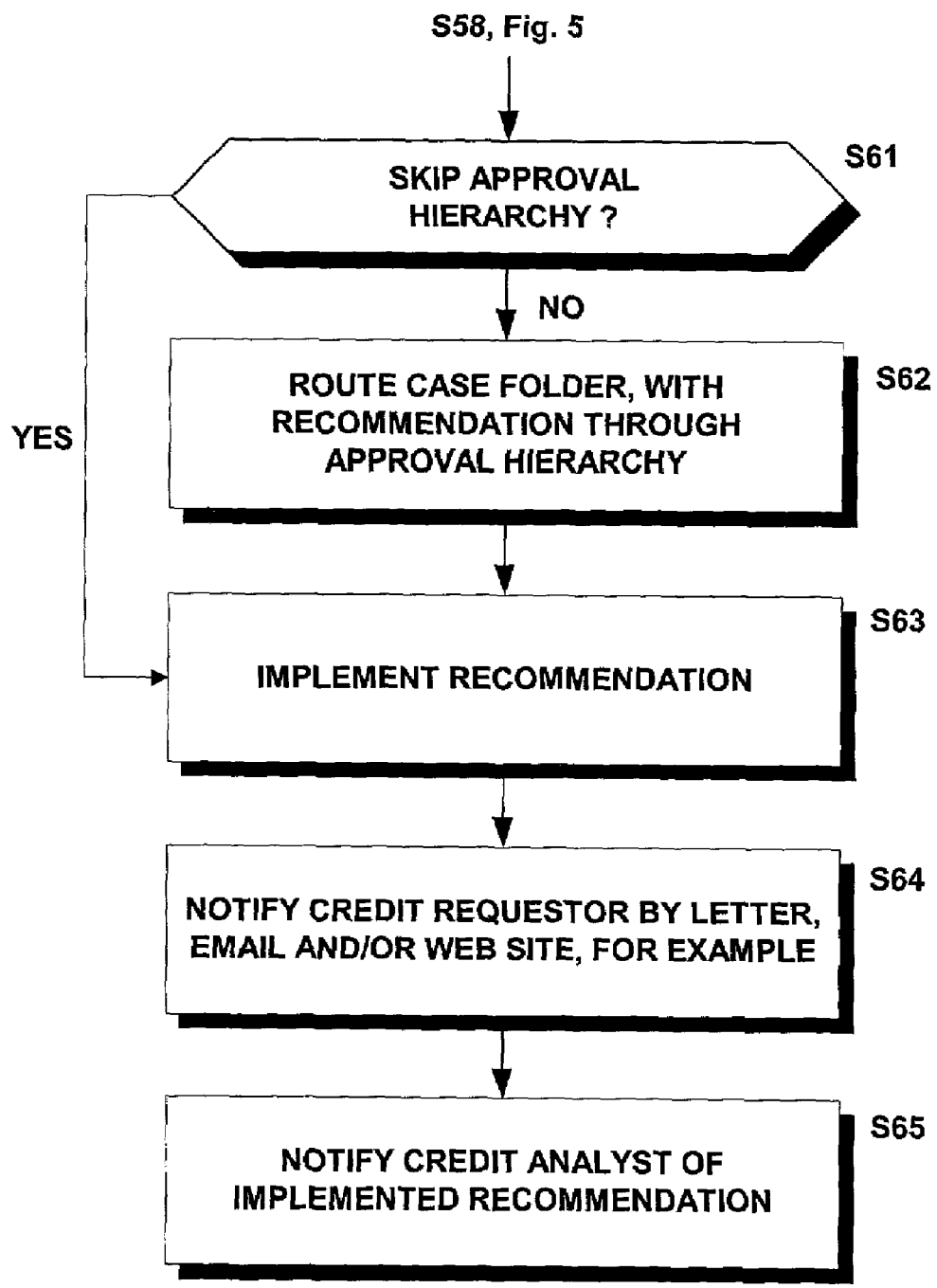
FIG. 6 is a flowchart of further aspects of the present invention, according to an embodiment thereof.

FIG. 6 is a flowchart of further aspects of the present invention, according to an embodiment thereof. FIG. 6 begins at step S58 of FIG. 5 and at S61 calls for a determination of whether to skip an approval hierarchy, such as hierarchy 322 of FIG. 3. During setup of the credit policy 116, the credit grantor 304 may choose to implement the generated recommendation without approval from a human credit analyst and/or without routing the recommended action through an approval hierarchy 322. If in step S61 it is determined that the approval hierarchy 322 should not be skipped, the case folder containing the recommended action is routed through the approval hierarchy 322 that includes one or more credit analysts having increasing credit decisioning authority, as shown at S62. If it is determined in step S61 that the approval hierarchy 322 should indeed be skipped, the generated recommendation may be implemented, as shown at S63. For example, an order by the credit requestor may be released from hold or a credit limit may be automatically increased or decreased, as appropriate. In step S64, a notification may be generated and sent to the credit requestor 310. The notification may be by any means, including for example, an email, a letter, a telephone call and/or an update on a Web site accessible to the credit requestor. A credit analyst, such as the credit analyst having primary responsibility for the case folder, may then be notified of the implemented recommendation, as shown at S65.

Hardware Overview

Figure 7:
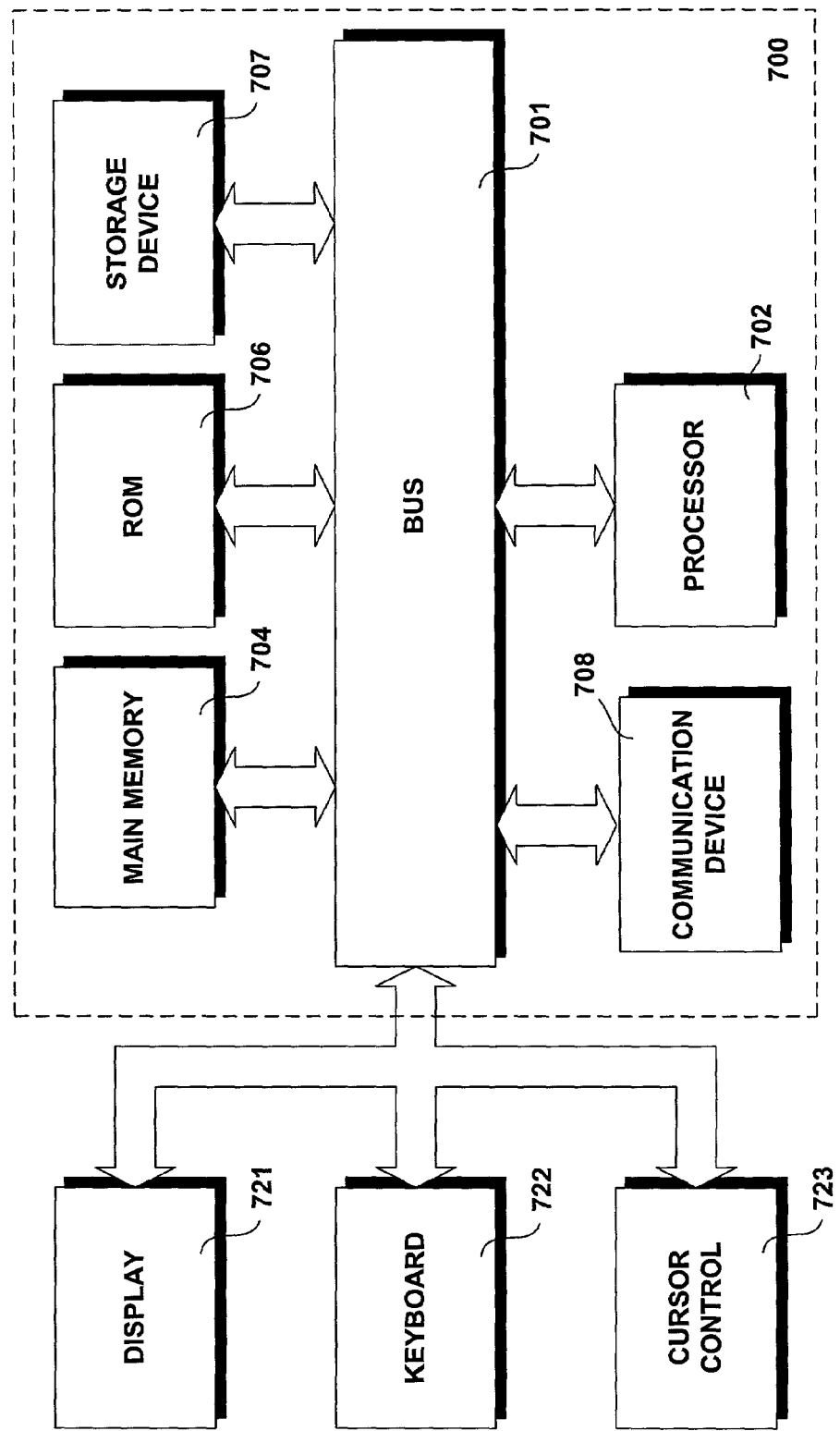
FIG. 7 illustrates a block diagram of a computer with which an embodiment of the present invention may be implemented.

FIG. 7 illustrates a block diagram of a computer 700 with which an embodiment of the present invention may be implemented. Computer system 700 includes a bus 701 or other communication mechanism for communicating information, and a processor 702 coupled with bus 701 for processing information. Computer system 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computer system 700 also includes a read only memory (ROM) and/or other static storage device 706 coupled to bus 701 for storing static information and instructions for processor 702. A data storage device 707, such as a magnetic disk or optical disk, is coupled to bus 701 for storing information and instructions.

Computer system 700 may also be coupled via bus 701 to a display device 721, such as a cathode ray tube (CRT), for displaying information to a computer user. An alphanumeric input device 722, including alphanumeric and other keys, is typically coupled to bus 701 for communicating information and command selections to processor 702. Another type of user input device is cursor control 723, such as a mouse, a trackball, or cursor direction keys for communicating direction information and command selections to processor 702 and for controlling cursor movement on display 721. This input device typically has two degrees of freedom in two axes, a first axis (e.g., x) and a second axis (e.g., y), which allows the device to specify positions in a plane.

Alternatively, other input devices, such as a fingerprint reader, a retina scanner and/or other biometric information measuring and/or acquiring devices may be included. Alternately, a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 722, in which case all interactions therewith may be carried out via alternative input devices, such as a stylus and the written text may be interpreted using optical character recognition (OCR) techniques, for example.

The present invention is related to the use of computer system 700 to provide methods and systems for managing credit. According to one embodiment, the methods according to the present invention are implemented by one or more computer systems 700 in response to processor(s) 702 executing sequences of instructions contained in memory 704. Such instructions may be read into memory 704 from another computer-readable medium, such as data storage device 707. Execution of the sequences of instructions contained in memory 704 causes processor(s) 702 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Indeed, those of skill in this art will recognize other alternative embodiments and all such embodiments are deemed to fall within the scope of the present invention. Thus, the present invention should be limited only by the claims as set forth below.

What is claimed is:

1. A computer-implemented method for a credit grantor to manage a credit of a credit requestor, comprising the steps of:
   upon the occurrence of an event:
   assigning a Credit Classification to the credit requestor, the Credit Classification being related to a credit risk of the credit requestor;
   determining a Type of Review to carry out for the credit requestor based upon a nature of the event;
   providing a plurality of checklists of data items required to be collected, the data items of each provided checklist being determined at least by a combination of the assigned Credit Classification and the determined Type of Review;
   storing the plurality of checklists of data items to be collected;
   selecting, using a computer, one of the stored plurality checklists of data items based upon the combination of the assigned Credit Classification and the determined Type of Review;

creating or updating a case folder for the requestor, the case folder including the selected checklist of data items to be collected;

collecting each required data item of the selected checklist and storing each collected data item in the case folder;

analyzing the collected data items in the case folder according to a score sheet and a workflow, the score sheet being determined at least by the combination of the assigned Credit Classification and determined Type of Review and calculating a credit score for the credit requestor, and generating a recommended action based upon the calculated credit score.

2. The method of claim 1, wherein the event is initiated by the credit requestor.

3. The method of claim 1, wherein the event is initiated by the credit grantor.

4. The method of claim 1, wherein the event includes at least one of a timed action by the credit grantor and action by the credit requestor.

5. The method of claim 4, wherein the timed action by the credit grantor includes a periodic credit review of the credit requestor's credit.

6. The method of claim 4, wherein the action by the credit requestor includes at least one of a request by the credit requestor for an increased credit limit, a request for new credit by a prospect, an order by the credit requestor, a hold on an order and at least one definable action.

7. The method of claim 1, wherein the Credit Classification of the credit requestor is selected from a group including at least one of mature, newly established, emerging, externally funded, prospect and at least one definable Credit Classification.

8. The method of claim 1, wherein the Type of Review is selected from a group including at least one of new credit limit, quarterly review, semi-annual review, annual review, order, order hold, over-credit limit and at least one definable Type of Review.

9. The method of claim 1, wherein the collecting step includes accessing at least one of an internal database of credit information and an external database of credit information.

10. The method of claim 1, wherein the internal database of credit information includes accounts receivables information for the credit requestor.

11. The method of claim 9, wherein the collecting step includes a step of manually collecting at least some of the required data items of the selected checklist.

12. The method of claim 1, further comprising the step of selecting one of a plurality of credit score sheets based upon the assigned Credit Classification and the determined Type of Review, the score sheets establishing required ranges for at least some of the collected data items of the selected checklist.

13. The method of claim 1, further comprising the step of calculating the credit score from the selected score sheets determined by the assigned Credit Classification and the determined Type Of Review, the calculated score sheet establishing required ranges for at least some of the collected data items of the selected checklist.

14. The method of claim 12, wherein the required ranges vary for each data item depending upon the assigned Credit Classification and the determined Type of Review.

15. The method of claim 1, wherein the analyzing step is carried free of intervention from a human credit analyst when each of the collected data items fall within the corresponding required ranges established by the selected one of the plurality of score sheets.

16. The method of claim 1, wherein the analyzing step is carried out at least partially by a human credit analyst.

17. The method of claim 1, wherein the checklists of data items to be collected includes at least one optional data item.

18. The method of claim 1, further comprising a step of storing a time-stamped version of the case folder.

19. The method of claim 1, further comprising the step of implementing the recommended action according to an automation rule selected from among a plurality of automation rules.

20. The method of claim 19, wherein the implementing step includes a notifying step in which the credit requestor is notified of at least one of the recommended action and the implementation of the recommended action.

21. The method of claim 20, wherein the implementing step includes a notifying step in which a human analyst is notified of at least one of the recommended action and the implementation of the recommended action.

22. The method of claim 20, wherein the notifying step includes at least one of an emailing step, a faxing step, a letter generating step and a step of updating a Web site.

23. The method of claim 1, wherein the case folder includes a free form notes field configured to enable a credit analyst to enter free form notes in the case folder.

24. The method of claim 1, wherein the generating step is not carried out until all required data items are collected and stored in the case folder.

25. The method of claim 1, further comprising a step of notifying a human credit analyst if all required data items cannot be collected.

26. The method of claim 1, further including an automation rule that specifies that the case folder is to be forwarded to a human credit analyst or through a hierarchy of credit analysts for review and approval prior to implementing the recommended action.

27. The method of claim 26, wherein the automation rule specifies that the generated recommended action may be implemented without forwarding the case folder to a human credit analyst or through a hierarchy of credit analysts for review and approval prior to implementing the recommended action.

28. A system for a credit grantor to manage a credit of a credit requestor, comprising:

at least one processor;

at least one data storage device;

a plurality of processes spawned by the at least one processor, the processes including processing logic for:

upon the occurrence of an event:

assigning a Credit Classification to the credit requestor, the Credit Classification being related to a credit risk of the credit requestor;

determining a Type of Review to carry out for the credit requestor based upon a nature of the event;

providing a plurality of checklists of data items required to be collected, the data items of each provided checklist being determined at least by a combination of the assigned Credit Classification and the determined Type of Review;

storing the plurality of checklists of data items to be collected;

selecting one of the stored plurality checklists of data items based upon the combination of the assigned Credit Classification and the determined Type of Review;

creating or updating a case folder for the requestor, the case folder including the selected checklist of data items to be collected;

collecting each required data item of the selected checklist and storing each collected data item in the case folder;

analyzing the collected data items in the case folder according to a score sheet, the score sheet being determined at least by the combination of the assigned Credit Classification and determined Type of Review and calculating a credit score for the credit requestor, and generating a recommended action based upon the calculated credit score.

29. The system of claim 28, wherein the event is initiated by the credit requestor.

30. The system of claim 28, wherein the event is initiated by the credit grantor.

31. The system of claim 28, wherein the event includes at least one of a timed action by the credit grantor and action by the credit requestor.

32. The system of claim 31, wherein the timed action by the credit grantor includes a periodic credit review of the credit requestor's credit.

33. The system of claim 31, wherein the action by the credit requestor includes at least one of a request by the credit requestor for an increased credit limit, a request for new credit by a prospect, an order by the credit requestor, a hold on an order and at least one definable action.

34. The system of claim 28, wherein the Credit Classification of the credit requestor is selected from a group including at least one of mature, newly established, emerging, externally funded, prospect and at least one definable Credit Classification.

35. The system of claim 28, wherein the Type of Review is selected from a group including at least one of new credit limit, quarterly review, semi-annual review, annual review, order, order hold, over-credit limit and at least one definable Type of Review.

36. The system of claim 28, wherein the collecting step includes accessing at least one of an internal database of credit information and an external database of credit information.

37. The system of claim 28, wherein the internal database of credit information includes accounts receivables information for the credit requestor.

38. The system of claim 36, wherein the collecting step includes a step of manually collecting at least some of the required data items of the selected checklist.

39. The system of claim 28, further comprising the step of selecting one of a plurality of credit score sheets based upon the assigned Credit Classification and the determined Type of Review, the score sheets establishing required ranges for at least some of the collected data items of the selected checklist.

40. The system of claim 28, further comprising the step of calculating the score sheets based upon the assigned Credit Classification and the determined Type Of Review, the calculated score sheet establishing required ranges for at least some of the collected data items of the selected checklist.

41. The system of claim 39, wherein the required ranges vary for each data item depending upon the assigned Credit Classification and the determined Type of Review.

42. The system of claim 28, wherein the analyzing step is carried free of intervention from a human credit analyst when each of the collected data items fall within the corresponding required ranges established by the selected one of the plurality of score sheets.

43. The system of claim 28, wherein the analyzing step is carried out at least partially by a human credit analyst.

44. The system of claim 28, wherein the checklists of data items to be collected includes at least one optional data item.

45. The system of claim 28, further comprising a step of storing a time-stamped version of the case folder.

46. The system of claim 28, further comprising the step of implementing the recommended action according to an automation rule selected from among a plurality of automation rules.

47. The system of claim 46, wherein the implementing step includes a notifying step in which the credit requestor is notified of at least one of the recommended action and the implementation of the recommended action.

48. The system of claim 47, wherein the implementing step includes a notifying step in which a human analyst is notified of at least one of the recommended action and the implementation of the recommended action.

49. The system of claim 47, wherein the notifying step includes at least one of an emailing step, a faxing step, a letter generating step and a step of updating a Web site.

50. The system of claim 28, wherein the case folder includes a free form notes field configured to enable a credit analyst to enter free form notes in the case folder.

51. The system of claim 28, wherein the generating step is not carried out until all required data items are collected and stored in the case folder.

52. The system of claim 28, further comprising a step of notifying a human credit analyst if all required data items cannot be collected.

53. The system of claim 28, further including an automation rule that specifies that the case folder is to be forwarded to a human credit analyst or through a hierarchy of credit analysts for review and approval prior to implementing the recommended action.

54. The system of claim 53, wherein the automation rule specifies that the generated recommended action may be implemented without forwarding the case folder to a human credit analyst or through a hierarchy of credit analysts for review and approval prior to implementing the recommended action.

55. A machine-readable medium having data stored thereon representing sequences of instructions which, when executed by a computing device, causes the computing device to enable a credit grantor to manage a credit of a credit requestor, the sequences of instructions being configured to carry out the steps of:

upon the occurrence of an event:

assigning a Credit Classification to the credit requestor, the Credit Classification being related to a credit risk of the credit requestor;

determining a Type of Review to carry out for the credit requestor based upon a nature of the event;

providing a plurality of checklists of data items required to be collected, the data items of each provided checklist being determined at least by a combination of the assigned Credit Classification and the determined Type of Review;

storing the plurality of checklists of data items to be collected;

selecting one of the stored plurality checklists of data items based upon the combination of the assigned Credit Classification and the determined Type of Review;

creating or updating a case folder for the requestor, the case folder including the selected checklist of data items to be collected;

collecting each required data item of the selected checklist and storing each collected data item in the case folder;

analyzing the collected data items in the case folder according to a score sheet, the score sheet being determined at least by the combination of the assigned Credit Classification and determined Type of Review and calculating a credit score for the credit requestor, and generating a recommended action based upon the calculated credit score.

56. The medium of claim 55, wherein the event is initiated by the credit requestor.

57. The medium of claim 55, wherein the event is initiated by the credit grantor.

58. The medium of claim 55, wherein the event includes at least one of a timed action by the credit grantor and action by the credit requestor.

59. The medium of claim 58, wherein the timed action by the credit grantor includes a periodic credit review of the credit requestor's credit.

60. The medium of claim 58, wherein the action by the credit requestor includes at least one of a request by the credit requestor for an increased credit limit, a request for new credit by a prospect, an order by the credit requestor, a hold on an order and at least one definable action.

61. The medium of claim 55, wherein the Credit Classification of the credit requestor is selected from a group including at least one of mature, newly established, emerging, externally funded, prospect and at least one definable Credit Classification.

62. The medium of claim 55, wherein the Type of Review is selected from a group including at least one of new credit limit, quarterly review, semi-annual review, annual review, order, order hold, over-credit limit and at least one definable Type of Review.

63. The medium of claim 55, wherein the collecting step includes accessing at least one of an internal database of credit information and an external database of credit information.

64. The medium of claim 55, wherein the internal database of credit information includes accounts receivables information for the credit requestor.

65. The medium of claim 63, wherein the collecting step includes a step of manually collecting at least some of the required data items of the selected checklist.

66. The medium of claim 55, further comprising the step of selecting one of a plurality of credit score sheets based upon the assigned Credit Classification and the determined Type of Review, the score sheets establishing required ranges for at least some of the collected data items of the selected checklist.

67. The medium of claim 55, wherein the credit score is calculated based upon the assigned Credit Classification and the determined Type Of Review, the score sheet establishing required ranges for at least some of the collected data items of the selected checklist.

68. The medium of claim 66, wherein the required ranges vary for each data item depending upon the assigned Credit Classification and the determined Type of Review.

69. The medium of claim 55, wherein the analyzing step is carried free of intervention from a human credit analyst when each of the collected data items fall within the corresponding required ranges established by the selected one of the plurality of score sheets.

70. The medium of claim 55, wherein the analyzing step is carried out at least partially by a human credit analyst.

71. The medium of claim 55, wherein the checklists of data items to be collected includes at least one optional data item.

72. The medium of claim 55, further comprising a step of storing a time-stamped version of the case folder.

73. The medium of claim 55, further comprising the step of implementing the recommended action according to an automation rule.

74. The medium of claim 73, wherein the implementing step includes a notifying step in which the credit requestor is notified of at least one of the recommended action and the implementation of the recommended action.

75. The medium of claim 74, wherein the implementing step includes a notifying step in which a human analyst is notified of at least one of the recommended action and the implementation of the recommended action.

76. The medium of claim 74, wherein the notifying step includes at least one of an emailing step, a faxing step, a letter generating step and a step of updating a Web site.

77. The medium of claim 55, wherein the case folder includes a free form notes field configured to enable a credit analyst to enter free form notes in the case folder.

78. The medium of claim 55, wherein the generating step is not carried out until all required data items are collected and stored in the case folder.

79. The medium of claim 55, further comprising a step of notifying a human credit analyst if all required data items cannot be collected.

80. The medium of claim 55, further including an automation rule that specifies that the case folder is to be forwarded to a human credit analyst or through a hierarchy of credit analysts for review and approval prior to implementing the recommended action.

81. The system of claim 53, wherein the automation rule specifies that the generated recommended action may be implemented without forwarding the case folder to a human credit analyst or through a hierarchy of credit analysts for review and approval prior to implementing the recommended action.

* * * * *

UNITED STATES PATENT AND TRADEMARK OFFICE
CERTIFICATE OF CORRECTION

PATENT NO. : 7,552,086 B1
APPLICATION NO. : 10/005102
DATED : June 23, 2009
INVENTOR(S) : Sunil Rajasekar et al.

Page 1 of 1

It is certified that error appears in the above-identified patent and that said Letters Patent is hereby corrected as shown below:

On the title page, in item (57), in column 2, in "Abstract", line 7, delete "checklists" and insert -- checklist --, therefor.

On the title page, in item (57), in column 2, in "Abstract", line 20, delete "the" and insert -- then --, therefor.

On sheet 1 of 6, in Figure 2, line 6, delete "Quaterly" and insert -- Quarterly --, therefor.

In column 1, line 10, delete "customers" and insert -- customer's --, therefor.

Signed and Sealed this

Sixth Day of July, 2010

David J. Kappos
*Director of the United States Patent and Trademark Office*